United States Patent
Kim

(10) Patent No.: US 8,636,099 B2
(45) Date of Patent: Jan. 28, 2014

(54) RACK-DRIVEN STEERING APPARATUS AND RACK-DRIVEN AUXILIARY POWER STEERING APPARATUS INCLUDING THE SAME

(71) Applicant: Mando Corporation, Gyeonggi-do (KR)

(72) Inventor: Kyoung Min Kim, Gyeongsangbuk-do (KR)

(73) Assignee: MANDO Corporation, Gyeonggi-do (KR)

( * ) Notice: Subject to any disclaimer, the term of this patent is extended or adjusted under 35 U.S.C. 154(b) by 0 days.

(21) Appl. No.: 13/668,780

(22) Filed: Nov. 5, 2012

(65) Prior Publication Data
US 2013/0112493 A1 May 9, 2013

(30) Foreign Application Priority Data
Nov. 3, 2011 (KR) .......... 10-2011-0113702

(51) Int. Cl.
*B62D 5/04* (2006.01)

(52) U.S. Cl.
USPC ............................................. 180/444

(58) Field of Classification Search
USPC .................. 180/443, 444, 427; 74/424.71
See application file for complete search history.

(56) References Cited

U.S. PATENT DOCUMENTS

| | | | |
|---|---|---|---|
| 7,891,460 B2* | 2/2011 | Kim ............................... | 180/443 |
| 8,354,810 B2* | 1/2013 | Horii et al. ............... | 318/400.23 |
| 2006/0123926 A1* | 6/2006 | Paek ........................ | 73/862.326 |
| 2006/0162991 A1* | 7/2006 | Kuehnhoefer et al. ....... | 180/444 |
| 2007/0205041 A1* | 9/2007 | Nishizaki et al. ............. | 180/446 |
| 2009/0071744 A1* | 3/2009 | Kim ............................... | 180/444 |
| 2013/0048411 A1* | 2/2013 | Lee ............................... | 180/444 |

* cited by examiner

*Primary Examiner* — Tashiana Adams
(74) *Attorney, Agent, or Firm* — McDermott Will & Emery LLP

(57) ABSTRACT

Disclosed are a rack-driven steering apparatus and a rack-driven auxiliary power steering apparatus including the same. The present invention can protect peripheral parts such as a motor for driving a nut pulley and an electronic control unit to improve durability when an excessive load reversely input from the outside is transmitted during an operation of a belt by the motor, and prevent a steering disabling state during a high speed travel of the vehicle, thereby providing a driver with a stable steering condition.

11 Claims, 6 Drawing Sheets

RACK-DRIVEN STEERING APPARATUS AND RACK-DRIVEN AUXILIARY POWER STEERING APPARATUS INCLUDING THE SAME

CROSS-REFERENCE TO RELATED APPLICATION

This application claims priority from and the benefit under 35 U.S.C. §119(a) of Korean Patent Application No. 10-2011-0113702, filed on Nov. 3, 2011, which is hereby incorporated by reference for all purposes as if fully set forth herein.

BACKGROUND OF THE INVENTION

1. Field of the invention

The present invention relates to a rack-driven steering apparatus and a rack-driven auxiliary power steering apparatus including the same, and more particularly to a rack-driven steering apparatus by which a steering force transmitted from the steering shaft to the rack bar can be transmitted more accurately and without loss, a separate rack bar supporting unit such as a support yoke and a yoke plug may not be employed, so that noise generated due to an increase of a gap caused by wear of the support yoke after the vehicle travels for a long time or generated by an impact reversely input from a road surface can be prevented and a comfortable steering feeling can be provided to the driver during the steering operation, and a rack-driven auxiliary power steering apparatus including the same.

2. Description of the Prior Art

As generally known in the art, a rack-driven auxiliary power steering apparatus includes a steering system extending from a steering wheel to two wheels, and an auxiliary power apparatus for supplying auxiliary steering power to the steering system.

FIG. 1 is a partially sectional view schematically illustrating a general rack-driven auxiliary power steering apparatus, and FIG. 2 is a sectional view schematically illustrating a portion of the general rack-driven auxiliary power steering apparatus.

The general rack-driven auxiliary power steering apparatus includes a steering system 100 extending from a steering wheel 105 to two wheels 150, and an auxiliary power apparatus 160 for supplying auxiliary steering power to the steering system 160.

The steering system 100 includes a steering shaft 110 an upper end of which is connected to the steering wheel 105 to be rotated together with the steering wheel 105 and a lower end of which is connected to a pinion shaft 120 via a pair of universal joints 115. The pinion shaft 120 is connected to a rack bar 155 through a rack-pinion mechanism 135, and opposite ends of the rack bar 155 are connected to the wheels 150 of the vehicle through tie rods 140 and knuckle arms 145.

In the rack-pinion mechanism 135, a pinion gear 125 formed at a lower end of the pinion shaft 120 and a rack gear 130 formed at one side of an outer peripheral surface of the rack bar 155 are engaged with each other.

The auxiliary power apparatus 160 includes a torque sensor 117 for detecting a steering torque applied to the steering wheel 105 by a driver and outputting an electric signal proportional to the detected steering torque, an electronic control unit (ECU) for generating a control signal based on the electric signal transferred from the torque sensor 117, a motor 165 for generating auxiliary steering power based on the control signal transferred from the electronic control unit, and an auxiliary power unit 170 for transmitting the auxiliary power generated by the motor 165 via a belt 210.

A rack bar supporting unit according to the related art includes a pinion gear 125, a rack bar 155, a support yoke 260, a spring 263, and a yoke plug 265. A rack-pinion type gearbox 210 converts a rotating force input from the steering shaft (not illustrated) as described above into linear movement.

The rack bar 155 is engaged with the pinion gear 125 to convert rotation into linear movement, and a unit for supporting the rack bar 155 toward the pinion gear 125 is installed on a rear surface of the rack bar 155 so that the rack bar 155 and the pinion gear 125 can be smoothly engaged with each other.

The unit for supporting the rack bar 155 includes a support yoke 260, a spring 263, and a yoke plug 265, and the support yoke 260 is located on a rear side of the rack bar 155, that is, at a side opposite to a surface where the rack gear 110 is formed, and is inserted into a cylinder 250 of the gearbox 130 to be moved in a forward/rearward direction perpendicular to the rack bar 155.

The support yoke 260 has a cylindrical shape to be slid forward and rearward in the cylinder 250, and a front part of the support yoke 260 in contact with the rack bar 155 forms a semicircular recess to be attached to a rear side of the rack bar 155.

A spring 263 is disposed at a rear side of the support yoke 260 so that the rack bar 155 and the pinion gear 125 are attached to each other to effectively transmit a force, pushing the support yoke 260 with a predetermined pressure and compensating a gap generated between the rack bar 155 and the pinion gear 125.

The support yoke 260 frictionally slid with respect to a rear surface of the rack bar 155, and is formed of a plastic softer than a general rack bar 155 to prevent the rack bar 155 from being worn out or generating noise due to friction.

The spring 263 accommodated in a spring groove 220 applies a pressure so that the support yoke 260 and the rack bar 155 are attached to each other and is generally a coil spring, and a yoke plug 265 is located on a rear surface of the spring 263 to support the spring 263.

The yoke plug 265 supports the spring 263 to apply a pressure to the support yoke 260. Screw threads and roots are formed in the yoke plug 265 to be fixedly coupled to the gearbox 210 and lock nuts 240 having threads and roots engaged with the threads and roots of the yoke plug 265.

However, in the rack-driven auxiliary power steering apparatus, an engaging force between the pinion gear and the rack gear is low due to a resilient deformation of the rack bar caused by a considerably long shape of the rack bar, making it essential to employ a rack bar supporting unit.

Further, in the rack bar supporting unit according to the related art, if the support yoke is worn out to a degree, a gap is increased, making it difficult to properly support the rack bar.

In addition, a rattle noise may be generated in the support yoke and the yoke plug due to an increase in a gap between the rack bar and the support yoke.

Furthermore, impact noise may be generated as an impact load reversely input from a road surface is not absorbed when the vehicle travels on a rough road such as an unpaved road, and in severe cases, the support yoke or the yoke plug may be damaged.

SUMMARY OF THE INVENTION

Accordingly, the present invention has been made to solve the above-mentioned problems occurring in the prior art, and an object of the present invention is to provide a rack-driven steering apparatus by which a steering force transmitted from the steering shaft to the rack bar can be transmitted more accurately and without loss, a separate rack bar supporting unit such as a support yoke and a yoke plug may not be employed, so that noise generated due to an increase of a gap caused by wear of the support yoke after the vehicle travels for a long time or generated by an impact reversely input from a road surface can be prevented and a comfortable steering feeling can be provided to the user during the steering operation, and a rack-driven auxiliary power steering apparatus including the same.

In order to accomplish this object, there is provided a rack-driven steering apparatus including: a first gear provided at a lower end of a steering shaft; a ball nut having one end provided with a second gear engaged with the first gear and having a screw groove on an inner periphery surface thereof to transmit a steering force of the steering shaft to a rack bar; and a rack bar coupled to an inner side of the ball nut and having a second screw groove corresponding to the first screw groove on an outer peripheral surface thereof to be slid during rotation of the ball nut.

In accordance with another aspect of the present invention, there is provided a rack-driven auxiliary power steering apparatus including: a first gear provided at a lower end of a steering shaft; a ball nut having one end provided with a second gear engaged with the first gear and having a first screw groove on an inner peripheral surface thereof to transmit a steering force of the steering shaft to a rack bar; a rack bar coupled to an inner side of the ball nut and having a second screw groove corresponding to the first screw groove on an outer peripheral surface thereof to be slid during rotation of the ball nut; a motor for generating an auxiliary steering force; and a nut pulley coupled to an outer peripheral surface of the ball nut such that the ball nut is rotated by a driving force of a belt driven by the motor, to transmit the auxiliary steering force.

According to the present invention, a steering force transmitted from the steering shaft to the rack bar can be transmitted more accurately and without loss, a separate rack bar supporting unit such as a support yoke and a yoke plug may not be employed, so that noise generated due to an increase of a gap caused by wear of the support yoke after the vehicle travels for a long time or generated by an impact reversely input from a road surface can be prevented and a comfortable steering feeling can be provided to the user during the steering operation.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
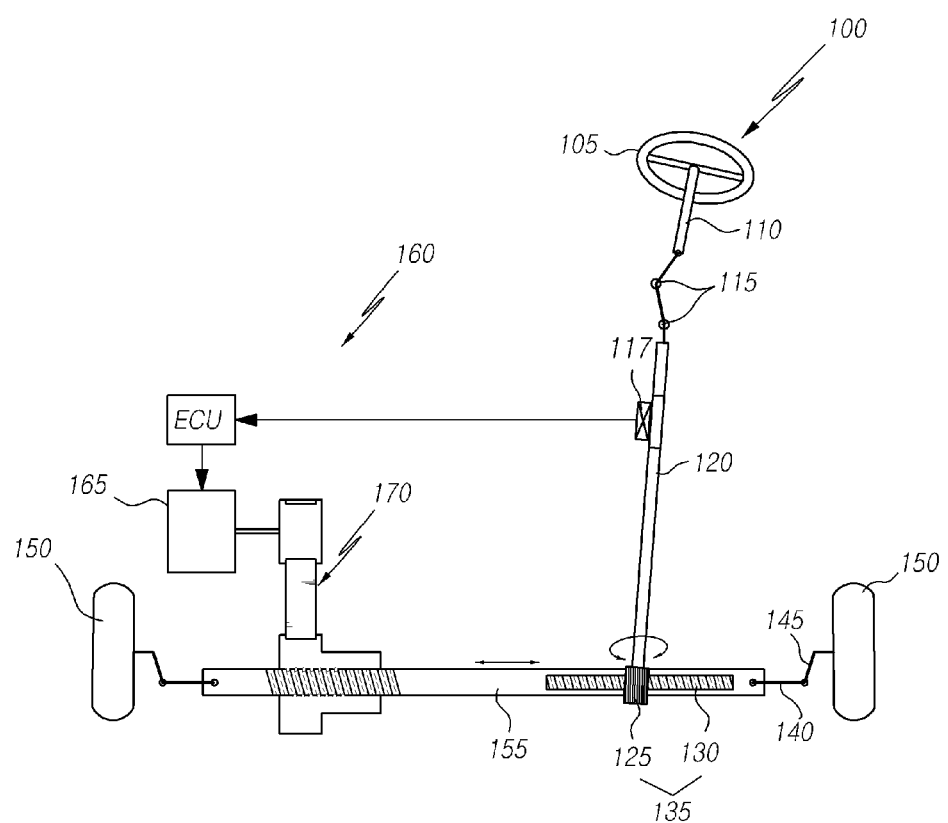
FIG. 1 is a partially sectional view schematically illustrating a general rack-driven auxiliary power steering apparatus.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
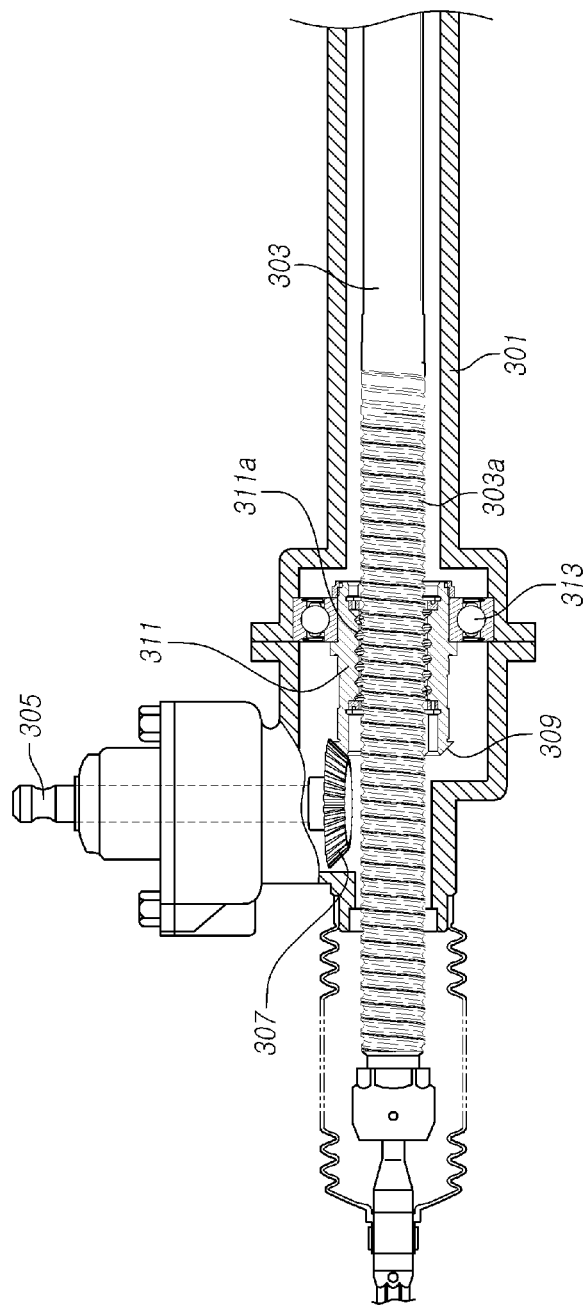
FIGS. 3 and 4 are sectional views illustrating portions of a rack-driven steering apparatus according to the present invention.
Figure 4:
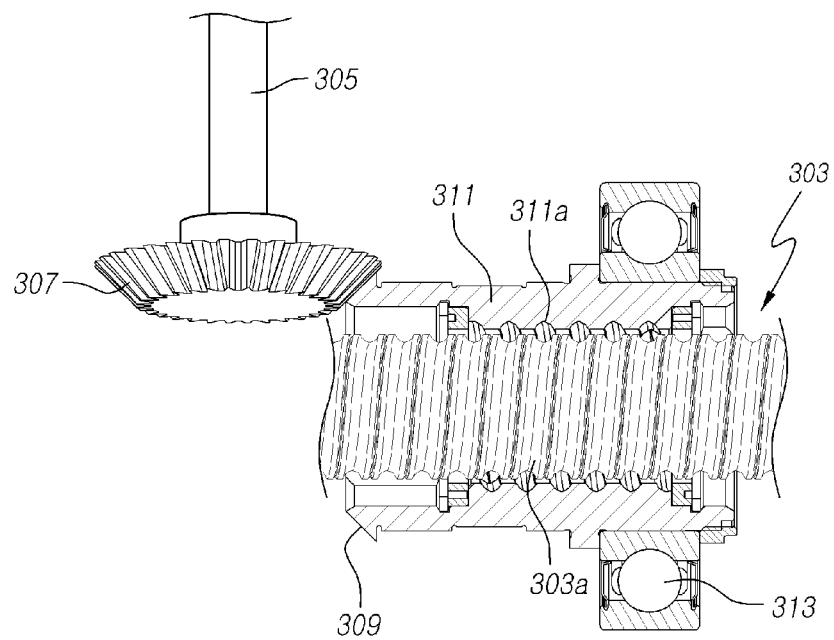
Figure 5:
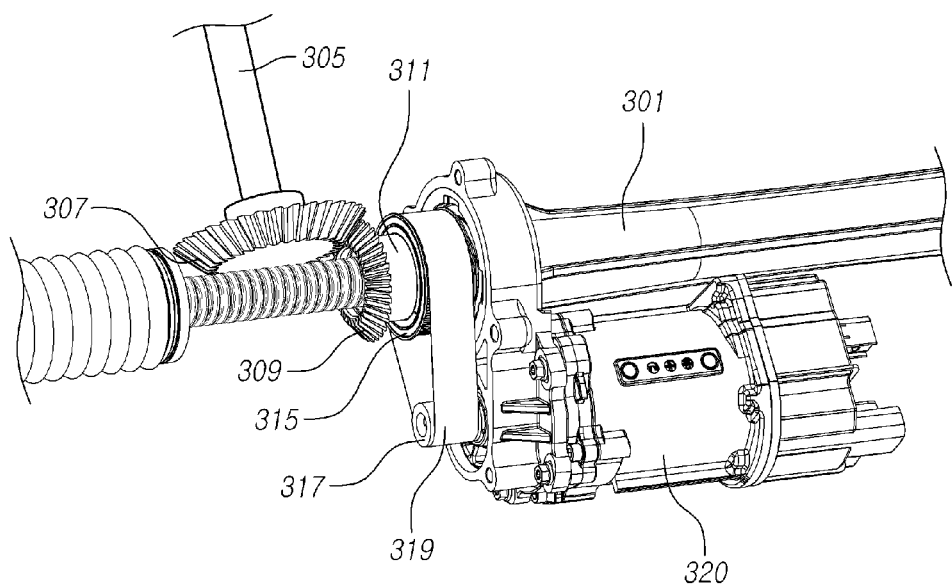
FIG. 5 is a perspective view illustrating a portion of a rack-driven auxiliary power steering apparatus according to the present invention.
Figure 6:
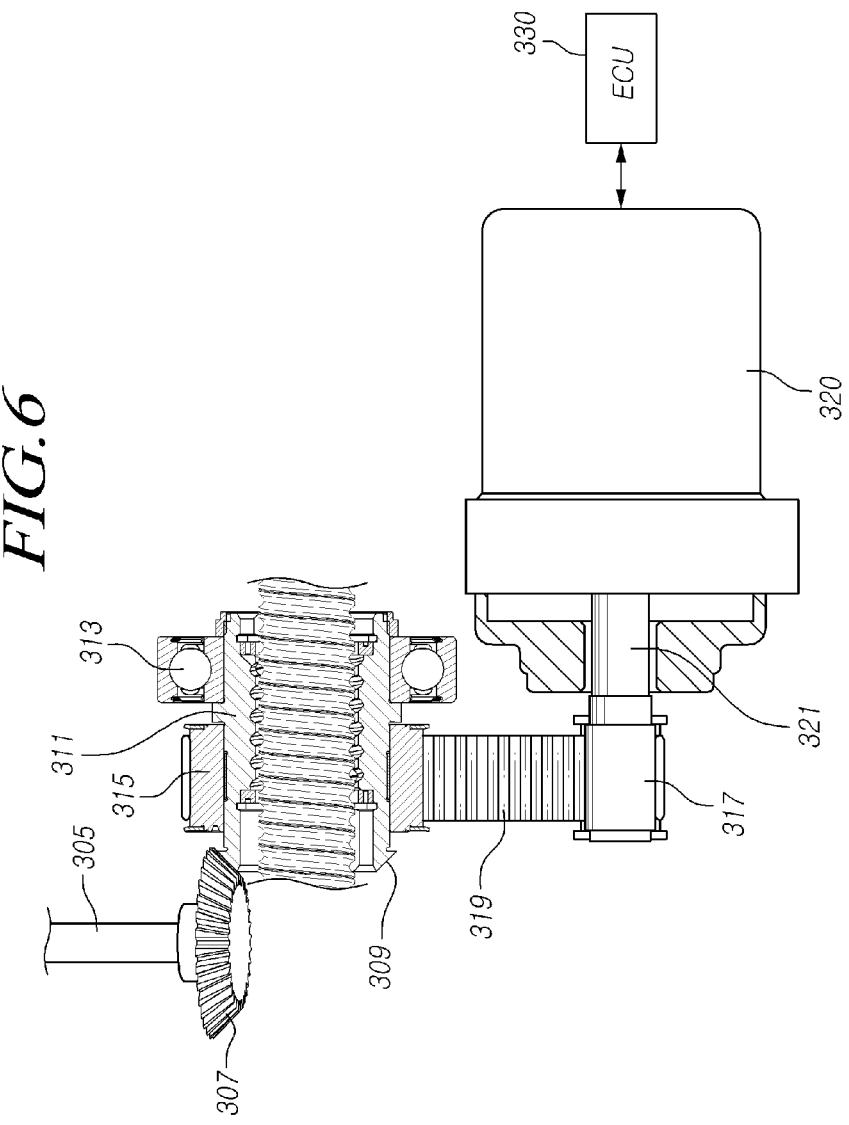
FIG. 6 is a sectional view of FIG. 5.

FIGS. 3 and 4 are sectional views illustrating portions of a rack-driven steering apparatus according to the present invention. FIG. 5 is a perspective view illustrating a portion of a rack-driven auxiliary power steering apparatus according to the present invention. FIG. 6 is a sectional view of FIG. 5.

As illustrated in the drawings, the rack-driven steering apparatus according to the present invention includes: a first gear 307 provided at a lower end of a steering shaft 305; a ball nut 311 having one end provided with a second gear 309 engaged with the first gear 307 and having a screw groove 311a on an inner periphery surface thereof to transmit a steering force of the steering shaft 305 to a rack bar 303; and a rack bar 303 coupled to an inner side of the ball nut 311 and having a second screw groove 303a corresponding to the first screw groove 311a on an outer peripheral surface thereof to be slid during rotation of the ball nut 311.

The rack-driven auxiliary power steering apparatus according to the present invention includes: a first gear 307 provided at a lower end of a steering shaft 305; a ball nut 311 having one end provided with a second gear 309 engaged with the first gear 307 and having a first screw groove 311a on an inner peripheral surface thereof to transmit a steering force of the steering shaft 305 to a rack bar 303; a rack bar 303 coupled to an inner side of the ball nut 311 and having a second screw groove 303a corresponding to the first screw groove 311a on an outer peripheral surface thereof to be slid during rotation of the ball nut 311; a motor 320 for generating an auxiliary steering force; and a nut pulley 315 coupled to an outer peripheral surface of the ball nut 311 such that the ball nut 311 is rotated by a driving force of a belt 319 driven by the motor 320, to transmit the auxiliary steering force.

Unlike the related art where a pinion gear (see 125 of FIG. 1) is engaged with a rack gear (see 130 of FIG. 1) of a rack bar 303, the first gear 307 provided at a lower end of the steering shaft 305 is spaced apart from the rack bar 303 by a predetermined distance, and an outer peripheral surface thereof, a diameter of which is expanded, is formed at a lower end of the steering shaft 305 to be inclined toward the steering shaft 305 and gear teeth are formed on the inclined outer peripheral surface of the first gear 307.

That is, the steering shaft 305 and the rack bar 303 are not coupled to each other and are installed at a predetermined angle to be spaced apart from each other, and the first gear 307 provided at a lower end of the steering shaft 305 is engaged with the second gear 309 of the ball nut 311 coupled to the rack bar 303 to transmit a rotating force of the steering shaft 305 to the ball nut 311.

Figure 2:
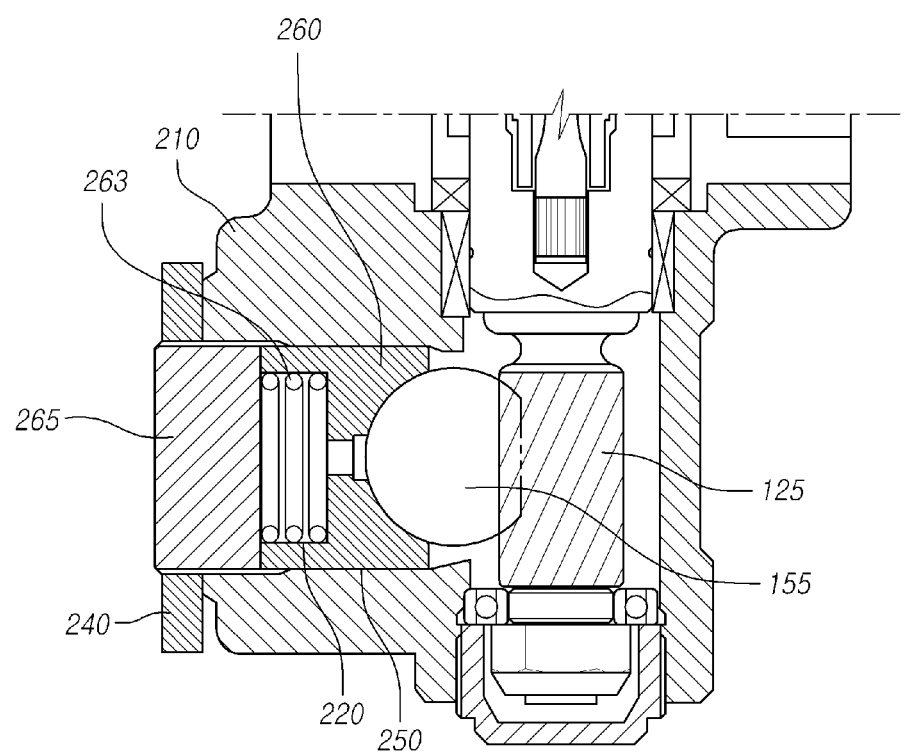
FIG. 2 is a sectional view schematically illustrating a portion of the general rack-driven auxiliary power steering apparatus.

Thus, an engaging force between the first gear 307 and the second gear 309 is enhanced, while improving power transmission performance without requiring a separate rack bar supporting unit including the support yoke (see 260 of FIG. 2) and the yoke plug (see 265 of FIG. 2) according to the related art.

The first gear 307 may be separately formed to be coupled to the steering shaft 305 or a lower end of the steering shaft 305 may be machined to be integrally formed with the steering shaft 305, and gear teeth of the first gear 307 are formed on the inclined outer peripheral surface of a lower end of the steering shaft 305 in a linear form in a direction of the steering shaft 305 or in a spiral form inclined at a predetermined angle.

The ball nut 311 is coupled to the rack bar 303 via balls (not illustrated) to slide the rack bar 303 in the rack housing while rotating, and the nut pulley 315 for rotating the ball nut 311 and a bearing 313 for supporting rotation of the ball nut 311 are mounted to an outer peripheral surface of the ball nut 311.

A power transmitting structure for axially sliding the rack bar 303 to generate an auxiliary steering force is provided on an inner peripheral surface of the ball nut 311 and an outer peripheral surface of the rack bar 303, and the power transmitting structure includes the second screw groove 303a formed on an outer peripheral surface of the rack bar 303 in a spiral form to have a semispherical or arc shape, balls (not illustrated) inserted thereinto, and the first screw groove 311a corresponding to the second screw groove 303a formed on an inner peripheral surface of the ball nut 311 in a spiral form to have a semispherical or arc shape.

The ball nut 311 is a hollow tube having the first screw groove 311a on an inner peripheral surface thereof, and the bearing 313 is installed on an outer peripheral surface thereof to be supported by and fixed to the rack housing 301.

The second gear 309 engaged with the first gear 307 is provided at one end of the ball nut 311, and the second gear 309 is formed at one end of the ball nut 311 to be inclined toward a center axis of the rack bar 303 and gear teeth are formed at the inclined end of the ball nut 311.

The second gear 309 may be separately formed to be coupled to one end of the ball nut 311 or one end of the ball nut 311 may be machined so that the second gear 309 is integrally formed with the ball nut 311, and the second gear 309 is formed at the inclined end of the ball nut 311 of the second gear 309 in a linear form in a center axis direction of the rack bar 303 or in a spiral form inclined at a predetermined angle with respect to a center axis direction of the rack bar 303.

The first gear 307 and the second gear 309 may be bevel gears as the installation angles of the steering shaft 305 and the rack bar 303 are substantially perpendicular to each other.

That is, bevel gears may be coupled to or integrally formed with a lower end of the steering shaft 305 and one end of the ball nut 311.

Meanwhile, the above-described rack-driven steering apparatus may further include an auxiliary power unit to constitute the rack-driven auxiliary power steering apparatus.

That is, the rack-driven auxiliary power steering apparatus according to the present invention includes: a first gear 307 provided at a lower end of a steering shaft 305; a ball nut 311 having one end provided with a second gear 309 engaged with the first gear 307 and having a first screw groove 311a on an inner peripheral surface thereof to transmit a steering force of the steering shaft 305 to a rack bar 303; a rack bar 303 coupled to an inner side of the ball nut 311 and having a second screw groove 303a corresponding to the first screw groove 311a on an outer peripheral surface thereof to be slid during rotation of the ball nut 311; a motor 320 for generating an auxiliary steering force; and a nut pulley 315 coupled to an outer peripheral surface of the ball nut 311 such that the ball nut 311 is rotated by a driving force of a belt 319 driven by the motor 320, to transmit the auxiliary steering force.

Here, the auxiliary power unit includes a driving unit and a driven unit, and the driving unit includes a motor 320 controlled by an electronic control unit (ECU) 330, a motor pulley 317 coupled to a shaft 321 of the motor 320, and a belt 319.

The driven unit includes a ball nut 311 supporting the rack bar 303 in the rack housing 301 surrounding the rack bar 303, and a nut pulley 315 coupled to an outer peripheral surface of the ball nut 311.

The motor pulley 317 connected to the motor 320, and the nut pulley 315 connected to the rack bar 303 are disposed parallel to each other, the belt 319 is mounted on the motor pulley 317 and the nut pulley 315 to transmit a rotating force of the motor 320 to the rack bar 303 through the ball nut 311, and the rack bar 303 is moved leftward and rightward by an operation of the ball nut 311 to generate an auxiliary steering force.

The ball nut 311 is coupled to the rack bar 303 via balls to slide the rack bar 303 in the rack housing while rotating, and the nut pulley 315 for rotating the ball nut 311 and the bearing 313 for supporting rotation of the ball nut 311, are mounted to an outer peripheral surface of the ball nut 311.

The above-described auxiliary power unit may further include: a torque sensor (see 117 of FIG. 1) for outputting an electric signal proportional to a steering torque when a driver manipulates the steering wheel; and an electronic control unit 330 for generating an auxiliary steering control signal based on an electric signal transferred from the torque sensor to transmit the auxiliary steering control signal to the motor 320.

Thus, the torque sensor detects a steering torque generated when a driver manipulates the steering wheel, and the electronic control unit transmits the auxiliary steering control signal to the motor based on the steering torque to supplement a steering force of the driver.

As described above, according to the present invention, a steering force transmitted from the steering shaft to the rack bar can be transmitted more accurately and without loss, a separate rack bar supporting unit such as a support yoke and a yoke plug may not be employed, so that noise generated due to an increase of a gap caused by wear of the support yoke after the vehicle travels for a long time or generated by an impact reversely input from a road surface can be prevented and a comfortable steering feeling can be provided to the user during the steering operation.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A rack-driven steering apparatus comprising:
    a first gear provided at a lower end of a steering shaft; and
    a ball nut having one end provided with a second gear engaged with the first gear and having a screw groove on an inner periphery surface thereof to transmit a steering force of the steering shaft to a rack bar,
    wherein the rack bar is coupled to an inner side of the ball nut and has a second screw groove corresponding to the first screw groove on an outer peripheral surface thereof to be slid during rotation of the ball nut, and
    the second gear extends from an end face of the ball nut so that at least a portion of the second gear overlaps the end face in an axial direction of the ball nut.

2. The rack-driven steering apparatus as claimed in claim 1, wherein an outer peripheral surface of the first gear, a diameter of which is expanded, is formed at a lower end of the steering shaft to be inclined toward the steering shaft and gear teeth are formed on the inclined outer peripheral surface of the first gear.

3. The rack-driven steering apparatus as claimed in claim 2, wherein the first gear is separately formed to be coupled to the steering shaft.

4. The rack-driven steering apparatus as claimed in claim 2, wherein the first gear is integrally formed with the steering shaft.

5. The rack-driven steering apparatus as claimed in claim 3 or 4, wherein the gear teeth of the first gear are formed in a linear form in a center axis direction thereof or in a spiral form inclined at a predetermined angle with respect to the center axis.

6. The rack-driven steering apparatus as claimed in claim 1, wherein the second gear is formed at one end of the ball nut to be inclined toward a center axis thereof or gear teeth are formed at the inclined end.

7. The rack-driven steering apparatus as claimed in claim 6, wherein the second gear is separately formed to be coupled to one end of the ball nut.

8. The rack-driven steering apparatus as claimed in claim 6, wherein the second gear is integrally formed with the ball nut.

9. The rack-driven steering apparatus as claimed in claim 7 or 8, wherein the gear teeth of the second gear are formed in a linear form in a center axis direction thereof or in a spiral form inclined at a predetermined angle with respect to the center axis.

10. A rack-driven auxiliary power steering apparatus comprising:
    a first gear provided at a lower end of a steering shaft;
    a ball nut having one end provided with a second gear engaged with the first gear and having a first screw groove on an inner peripheral surface thereof to transmit a steering force of the steering shaft to a rack bar;
    a rack bar coupled to an inner side of the ball nut and having a second screw groove corresponding to the first screw groove on an outer peripheral surface thereof to be slid during rotation of the ball nut;
    a motor for generating an auxiliary steering force; and
    a nut pulley coupled to an outer peripheral surface of the ball nut such that the ball nut is rotated by a driving force of a belt driven by the motor, to transmit the auxiliary steering force.

11. The rack-driven auxiliary power steering apparatus as claimed in claim 10, further comprising:
    a torque sensor for outputting an electric signal proportional to a steering torque when a driver manipulates a steering wheel; and
    an electronic control unit (ECU) for generating an auxiliary steering force control signal based on the electric signal transferred from the torque sensor and transmitting the auxiliary steering force control signal to the motor.

* * * * *